United States Patent [19]

Michaels et al.

[11] Patent Number: 5,124,549
[45] Date of Patent: Jun. 23, 1992

[54] AUTOMATIC HEADLAMP DIMMER WITH OPTICAL BAFFLE

[75] Inventors: Paul A. Michaels, Livonia; Harold R. Macks, Royal Oak; Michael R. Smith, Leonard, all of Mich.

[73] Assignee: Lectron Products, Inc., Rochester Hills, Mich.

[21] Appl. No.: 598,901

[22] Filed: Oct. 15, 1990

[51] Int. Cl.$^5$ .................................................. H01J 3/14
[52] U.S. Cl. .................................. 250/237 R; 250/239
[58] Field of Search .................. 250/239, 216, 237 R, 250/214 B, 221

[56] References Cited

U.S. PATENT DOCUMENTS

| | | |
|---|---|---|
| 3,271,577 | 9/1966 | Miller et al. ........................ 250/239 |
| 3,315,122 | 4/1967 | Schuler et al. . |
| 3,393,344 | 7/1968 | Engelmann . |
| 3,743,886 | 7/1973 | Cretien . |
| 3,751,711 | 8/1973 | Schick . |
| 3,775,639 | 11/1973 | Woodward . |
| 3,818,265 | 6/1974 | Hicks et al. . |
| 4,105,927 | 8/1978 | Wilje . |
| 4,211,923 | 7/1980 | Fukuyama et al. ................. 250/239 |
| 4,412,129 | 10/1983 | Duncan ............................... 250/221 |
| 4,599,544 | 7/1986 | Martin . |
| 4,645,975 | 2/1987 | Meitzler et al. . |
| 4,683,403 | 7/1987 | Iwamoto et al. . |
| 4,727,290 | 2/1988 | Smith et al. . |
| 4,728,861 | 3/1988 | Kurihara et al. . |
| 4,972,079 | 11/1990 | Blanding ............................. 250/239 |
| 4,978,844 | 12/1990 | Ujihara ............................... 250/216 |
| 4,990,768 | 2/1991 | Ito et al. ............................. 250/239 |
| 5,003,169 | 3/1991 | Sakaguchi et al. ................. 250/221 |

Primary Examiner—David C. Nelms
Attorney, Agent, or Firm—Harness, Dickey & Pierce

[57] ABSTRACT

A vehicle light sensor for controlling light responsive systems such as an automatic headlamp dimmer. The sensor includes an enclosure containing a lens and a photo responsive detector. An optical chamber within the enclosure permits unwanted light from reaching the detector. A series of baffles within the chamber prevent light from outside a desired entrance angle from reaching the detector. A thin-film aperture is attached to the detector for controlling the size and shape of the detector's field of view. Gray scale shading may also be incorporated into the aperture to reduce the intensity of incoming light in selected portions of the field of view. An adjustment mechanism provides very fine angular view adjustments, beyond what is practical by simple assembly of molded parts.

23 Claims, 3 Drawing Sheets

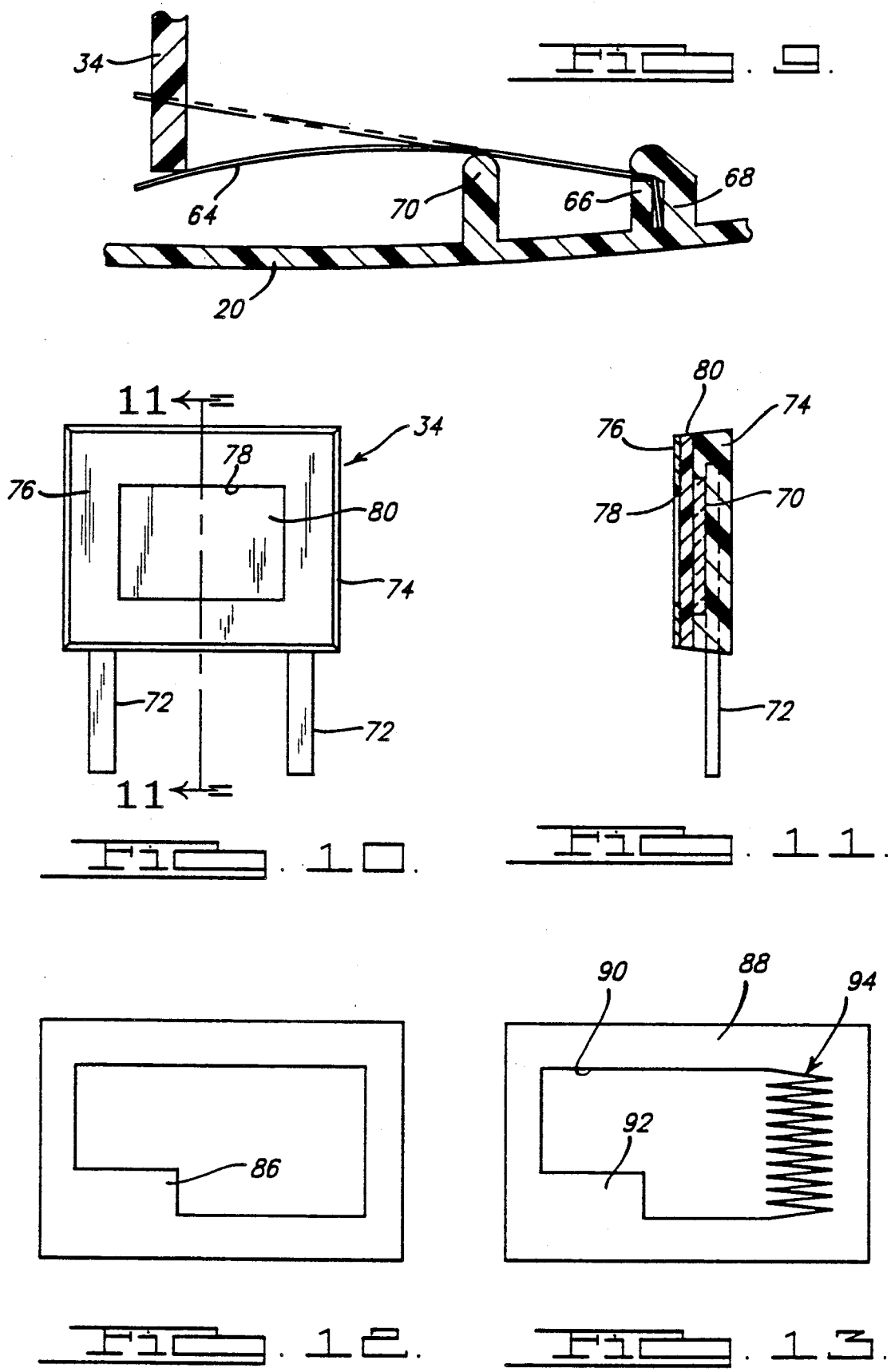

AUTOMATIC HEADLAMP DIMMER WITH OPTICAL BAFFLE

BACKGROUND AND SUMMARY OF THE INVENTION

This invention relates to vehicle light sensor systems, and particularly to a light sensor for an automatic headlamp dimmer.

Improved automotive control systems have freed drivers from performing a number of tasks that formerly required manual operations. Such systems relieve drivers from the distractions of these auxiliary systems and often can result in improved concentration and reduced driver fatigue. Key to the operation of such control systems is a means for sensing a condition to which the control system must respond. In automatic cruise control systems, for example, the sensed condition is the vehicle's velocity. In a number of systems, such as automatic day/night mirror controls and automatic headlamp dimmers, the condition to be sensed is the presence or absence of lights from other vehicles. For example, in automatic headlamp dimmer systems, when the headlamps are on, the control system normally sets the headlamps to the high beam mode unless the system senses the presence of another vehicle's headlights or taillights immediately in front of the subject vehicle.

While numerous automatic headlamp dimmer control systems have been developed, in general, many of these systems have had serious drawbacks due to their performance, complexity or cost. One area of difficulty has been in their packaging and optics. Since these systems must sense light from headlamps or taillamps from other vehicles, a key requirement is that the system be able to distinguish this light from extraneous incoming light. Examples of such unwanted light includes reflections from road signs, light from street lamps, or light from vehicles on other roadways. To overcome this problem, some prior systems have utilized various kinds of optical chambers surrounding a light sensitive detector to prevent unwanted light from reaching the detector. However these chambers are often bulky, expensive, and prone to permitting light to leak into the chamber. In addition, off-axis light rays from outside the desired entrance angle are sometimes scattered within the chamber until they reach the detector. This will degrade system performance and may necessitate a lower detector sensitivity.

In other prior headlamp dimmer control systems, separate aperture plates are utilized to define the desired entrance angle for the detector. However, in general, due to the distance between the aperture plate and the detector, a somewhat diffuse angular cutoff results. This yields less precise control over the entrance angle of light into the detector. In addition, with such aperture plates, misalignment or damage during manufacturing, shipment, or use, is likely to occur.

Another difficulty with prior automatic headlamp dimmer systems results from the critical alignment requirements of the optical components of the systems. In particular, in many systems, the distance and orientation of the detector, aperture, and lens must be held to within small tolerances. During mass production, changes in these tolerances (for example due to mold shrinkage) can necessitate separate operations to fine-tune the position of the lens or detector after manufacturing. This often requires expensive and time consuming machining operations.

In addition, prior automatic headlamp dimmer sensors do not generally take into account the varying intensity of the light to be sensed over the field of view. Since oncoming headlights to the left of the vehicle are much brighter than the taillights immediately in front of a vehicle, the detector must be sensitive over an extremely wide range of light intensity. This makes the system more susceptible to noise or to unwanted scattered light.

Accordingly, there is a need for a vehicle light sensor which is compact, inexpensive and easy to manufacture. There is also a need for a vehicle light sensor which precisely controls the entrance angle of the light and is not affected by light outside this angle. It is further desirable to provide a vehicle light sensor which is stable in manufacture and holds the optical components in precise alignment. It is also desirable to provide such a sensor which takes into account the varying intensity of light over different parts of its field of view to minimize the required range of sensitivity of the sensor.

In accordance with the present invention, a vehicle light sensor having the above-described desirable features is provided. The light sensor includes a detector for producing an electrical signal in response to incoming light. The detector is housed in upper and lower enclosure members. A lens receives light and focuses it on the detector. One of the enclosure members has a receptacle for mounting the lens. The upper and lower enclosure members also form an optical chamber adjacent to the light detector to prevent light that does not pass through the lens from reaching the detector. In addition, a plurality of optical baffles are provided within the optical chamber for preventing light from outside a desired entrance angle from reaching the detector.

In accordance with another embodiment of the present invention, the vehicle light sensor includes a thin aperture plate attached to the detector. The plate is opaque to light for preventing light from reaching the detector. An opening in the aperture plate permits light to reach the detector in selected areas. This opening may be in any predetermined shape to obstruct light in certain areas of the field of view of the detector and may also include shaded portions to reduce the intensity in selected portions of the field of view. Additional benefits and advantages of the present invention will become apparent to those skilled in the art to which this invention relates from the subsequent description of the preferred embodiments and the appended claims taken and conjunction with the accompany drawings.

BRIEF DESCRIPTION OF THE DRAWINGS

FIG. 9 is a cross-sectional view of the enclosure shown in FIG. 8 with the spring in the deflected position.

FIG. 10 is a front view of the detector and aperture plate in accordance with the present invention.

FIG. 11 is a sectional view taken along line 11—11 of the detector and aperture shown in FIG. 10.

FIG. 12 is a view of another embodiment of the aperture shown in FIG. 11 for masking the upper right hand portion of the field of view.

FIG. 13 is another embodiment of the aperture shown in FIG. 12 with variable attenuation in the left side of the field of view.

DETAILED DESCRIPTION OF THE INVENTION

Figure 1:
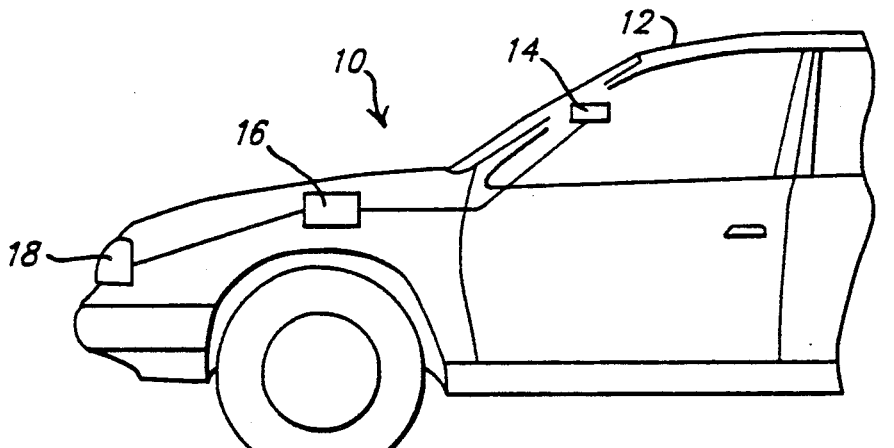
FIG. 1 is a view of a vehicle incorporating the automatic headlamp dimmer in accordance with the present invention.

FIG. 1 illustrates an automatic headlamp dimmer system 10 mounted to a vehicle 12 for controlling the actuation of high and low beams in the vehicle's headlamps. The automatic headlamp dimmer system 10 includes a sensor module 14 which is preferably located in the vicinity of the vehicle's central rear view mirror (not shown). The sensor module 14 is coupled to a headlamp control unit 16 which is coupled to the vehicle's front headlamps 18 for controlling their high/low beam operation. The sensor module 14 is preferably mounted in a position where its view through the vehicle's windshield is through the path of the vehicle's windshield wipers to insure an unobstructed optical path to sensor module 14 during inclement weather.

Figure 2:
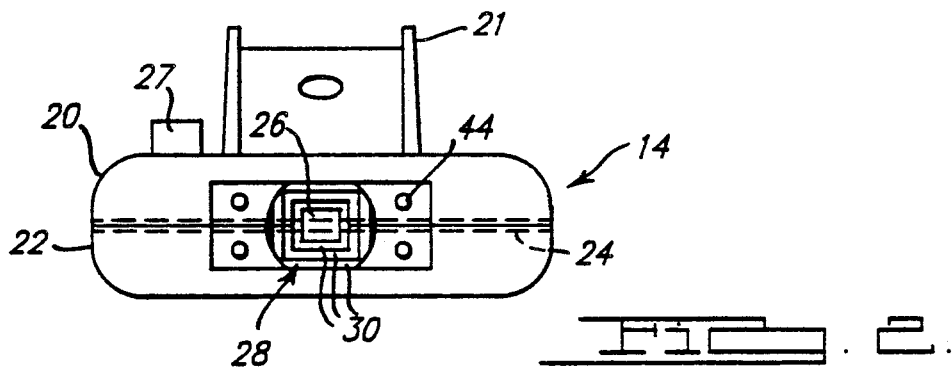
FIG. 2 is a view partially in phantom, of an enclosure for the automatic headlamp dimmer in accordance with the present invention.

The sensor module 14 is depicted in more detail in FIG. 2. In particular, the sensor module 14 includes lower 20 and upper 22 enclosure members. A mounting flange 21 is located on the top of the upper enclosure member 22. Mounted inside the lower and upper enclosures 20 and 22 is a printed circuit board 24 which includes a detector 26 as well as conventional detection circuitry for receiving, processing, and transmitting the light responsive electrical signals generated by the detector 26. An opening 27 in the upper enclosure member 22 is provided for permitting an electrical connector (not shown) to be connected to the circuit board 24.

An optical chamber 28 is formed by the lower 20 and upper 22 enclosure members for controlling the light that is available to the detector 26. That is, optical chamber 28 prevents unwanted ambient light from leaking in and reaching the detector. In addition, a series of baffles or apertures 30 are formed by the lower and upper enclosure members 20,22, to create a series of progressively smaller optical apertures in front of the sensor 26.

Figure 3:
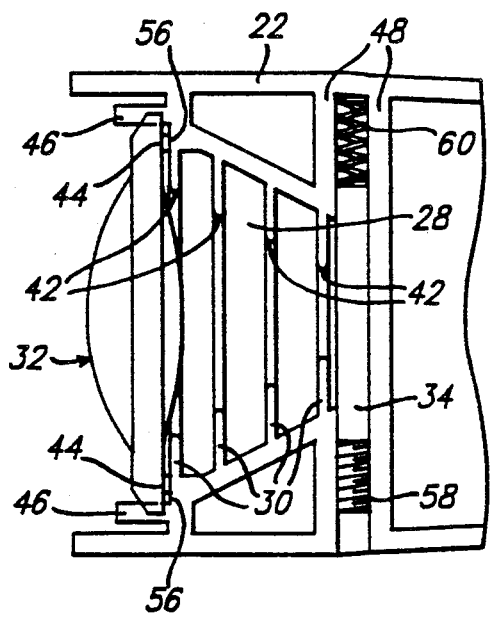
FIG. 3 is a plan view of the lower portion of the enclosure showing the optical chamber within.
Figure 7:
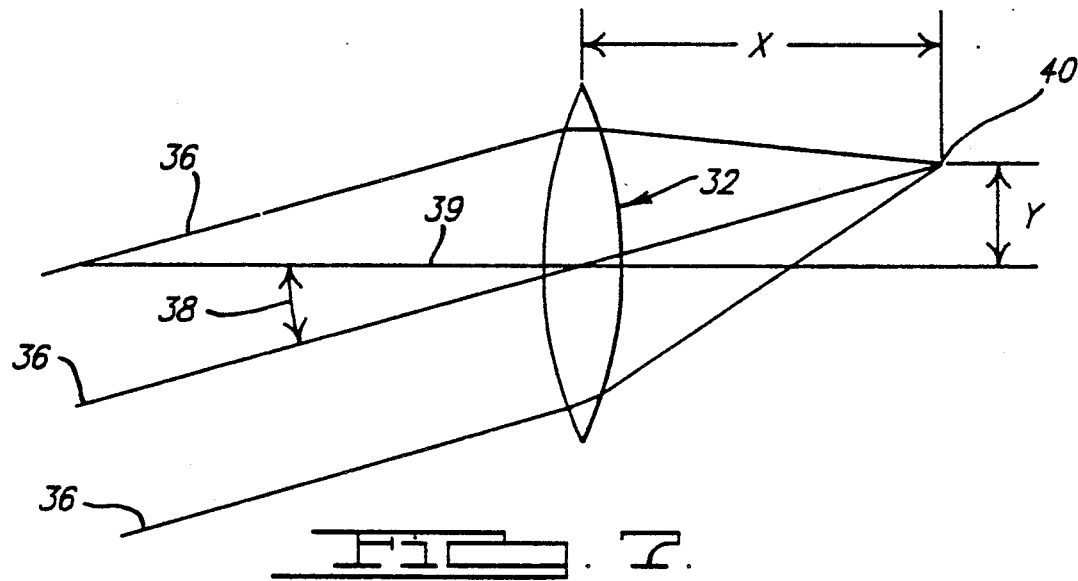
FIG. 7 is an optical ray diagram depicting the formation of an image by the lens shown in FIG. 4.

The optical baffles 30 are shown in more detail in FIG. 3. FIG. 3 is a plan view of a portion of the upper enclosure member 22 into which is mounted a lens 32 and a detector 34. It is desired that only light from within a predetermined entrance angle reach the detector 34. To illustrate, a ray diagram of the incoming light is shown in FIG. 7. Light rays 36 entering the lens 32 at an entrance angle 38 are refracted by the lens 32 and brought to a focus at point 40 in the focal plane of the lens. Entrance angle 38 is measured with respect to the lens axis 39. The focal plane is a distance X from the lens where X is equal to the lens focal length. It will be appreciated that light (from a point image) entering the lens 32 at an entrance angle 38 below the lens axis 39 will be focused to a point a distance Y above the lens axis where, $Y = X*[\tan(\text{entrance angle } 38)]$. Also if the point image is above the lens axis 39 the focal point will be below the lens axis 39. Thus the desired field of view of light captured by the detector 34 in FIG. 3 comprises the light originating within the conical solid defined by entrance angle 38. Accordingly, detector 34 is mounted at the focal plane, that is, at a distance X from lens 32 equal to its focal length.

The particular angle 38 chosen will depend on the requirements of the particular system. For example in an automatic headlamp dimmer system it has been found that in the horizontal plane an entrance angle of between −8.5 degrees and +5.5 degrees is desirable. It will also be appreciated that the image size is proportional to the focal length of the lens. It is desirable to decrease the size of the area of the light detector to lower cost. This can be accomplished by decreasing the focal length of the lens 32. The area of the lens 32 is dictated by the light gathering requirements of the automatic headlamp dimmer system 10 and consequently, as the focal length is decreased while maintaining a constant lens area, the speed of the lens is increased. A practical limit is reached at "F-stop" numbers (focal length/effective aperture diameter) less than one.

It is important to minimize the possibility of light outside the entrance angle 38 from reaching detector 34. To this end, as shown in FIG. 3 the baffles 30, have leading edges 42 that define the desired entrance angle. These baffles 30 "capture" extraneous light and prevent it from reaching the detector 34. It should be noted that without baffles 30 there is a likelihood that light from outside the entrance angle 38 will be reflected off the internal walls of the optical chamber 28 to the back surface of the lens 32 and onto the detector 34. With the baffles 30 it is much less likely that this will occur since the baffles 30 insure that most of this extraneous light is reflected within the chamber at least three times before it reaches the detector 34. Accordingly, the intensity levels of such reflected signals will be reduced sufficiently so as not to cause inadvertent operation of the system.

The lens 32 is preferably made of a high index-of-refraction material to minimize the lens thickness while maintaining a short focal length. This material may be optical grade polycarbonate, which can be injection molded to form a high quality non-spheric lens at relatively low cost. To preserve a small spot size at the detector surface a non-sphericle lens surface is preferred. Polycarbonate also displays good optical and mechanical characteristics over the minus 40° C. to plus 100° C. automotive temperature range that can occur at the mounting location behind the windshield.

The orientation and distance between the lens and light detector must be maintained to very tight tolerances to insure proper performance. This is achieved, in part, by injection molding the lens support and detector support as a single piece 22 from a low mold shrinkage, low thermal coefficient of expansion, stable plastic. Also, the lens 32 is supported by a series of lens support platforms 44 and alignment pins 46 molded into the lower housing member 22. Also, the detector 34 is held in place by a pair of support walls 48 molded into the housing 22. An example of a low cost molding material that has been found to be acceptable for the housing 22 is General Electric's 30% glass filled Noryl No. GFN3.

Figures 5, 6:
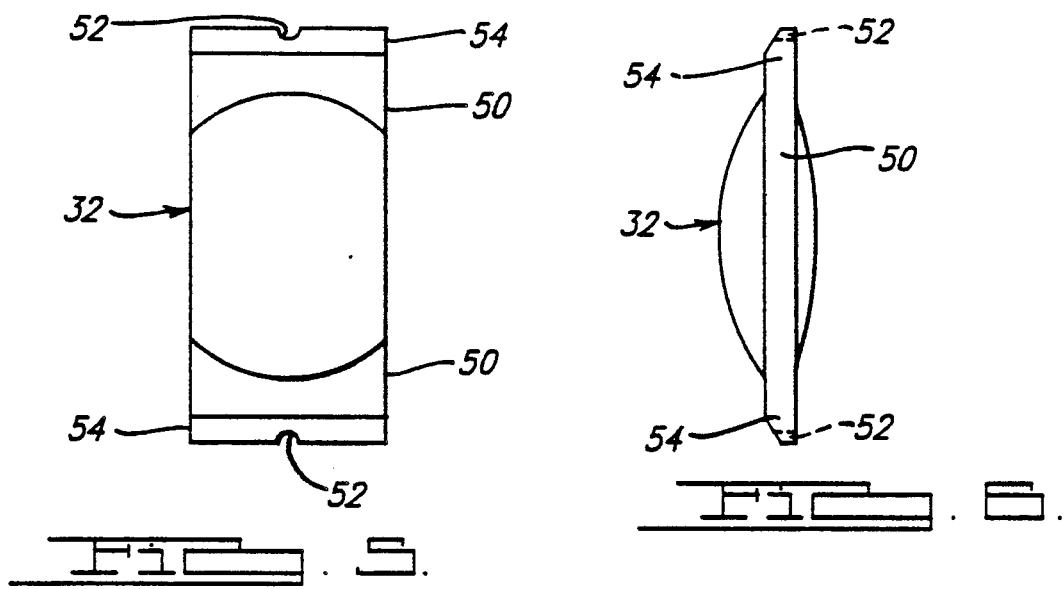
FIG. 5 is a front view of the lens shown in FIG. 4.
FIG. 6 is a side view of the lens shown in FIG. 4.

For ease of assembly, it is desirable that the lens be mounted onto its support easily, but precisely. The lens 32 must then be fastened to the support without introducing strain in the optical portion of the lens. To meet these requirements the lens 32 is molded with a flange 50 extending on two sides of the lens as shown in FIGS. 5 and 6. The flanges 50 include alignment slots 52 which are configured so that the alignment pins 46 fit into the alignment slots 52 for precise positioning of the lens 32. The flanges 50 include chamfered portions 54 which facilitate engagement of the flanges 50 with the alignment pins 46.

Figure 4:
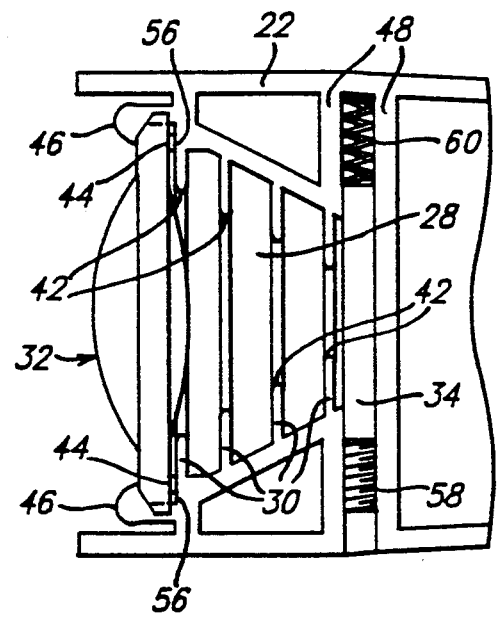
FIG. 4 is a plan view of the lower portion of the enclosure shown in FIG. 3 after the lens has been staked into place.

Once the lens 32 has been properly positioned against the lens support platforms 44, the lens 32 is secured in place by staking the ends of the alignment pins 46. In particular, as shown in FIG. 4, the heads of the alignment pins 46 are deformed around the flanges 50 to securely hold the lens 32 in place. Deformation of the alignment pins 46 can be accomplished in a number of standard methods, one preferred method being ultrasonic swagging because of its precision and low application cost. It should be noted that the swagging operation will also force pin material into the small space between the alignment slots 52 and alignment pins 46 that was left due to tolerance control in the lens and lens support molding operations. The net result is that the lens 32 is securely fastened in the housing 22 and will not shift in any direction relative to its support.

Surrounding each alignment pin 46 under the end of the lens flanges 50 is a small recess 56. This recess 56 provides relief for any mold flash that may be left at the ends of the lens flange. The recess 56 is important because the lens 32 must be seated properly at its specified height, even if a small molding flash develops as the molding tool wears.

Additionally, it will be appreciated that the series of support platforms 44 mass molded into the housing 22 provide a manufacturing adjustment capability for the lens seating height. In particular, if after the lens 32 is assembled into the housing 22 there is a small variance from design either in the image distance or image location (due to mold shrinkage or tool tolerance, etc.), of either the lens 32 or the housing 22, the variance can be corrected by changing the height of one or more of these supports 44. This can be readily accomplished by a simple machining operation to the supports 44, or to the mold from which they are made. On the other hand, if a flat lens support surface were provided, a more expensive change in the basic mold length between the lens support and the imaging detector 34 support might be required.

Due to variations in the molding process of the lens 32 and the support walls 48 (such as distortion caused by ejection of the molded pieces from the mold), it becomes difficult to hold the optical view angles to tolerances of less than 0.1 degrees, a desired requirement for the automatic headlamp dimmer system 10. Accordingly, it is desirable to provide means for positionally adjusting the detector 34 after final assembly.

The adjustment means provided in the preferred embodiment comprise an adjustment screw 58 and restoring spring 60 which are provided on opposite sides of the detector 34 between the support walls 48 to precisely control the horizontal position of the detector 34. The adjustment screw 58 is accessible from outside of the housing 22. When the adjustment screw 58 is turned clockwise the detector is moved upward as viewed in FIG. 3. When turned counterclockwise the restoring spring 60 moves the detector downwards. In either case, the detector 34 is firmly seated against the adjustment screw 58. In order to maintain a low molding cost, and at the same time provide a locking mechanism for the adjustment screw position 58, the adjustment screw guide hole 62 is molded as a simple smooth wall tube. Adjustment screw 58 comprises a thread deforming set screw which forms its threads in the deformable plastic when first installed, and holds the screw firmly in position after adjustment. It should be noted that thread cutting screws are not desirable since positional holding forces will be weaker, and thread chips could fall onto the optical surfaces of the detector 14.

Figure 8:
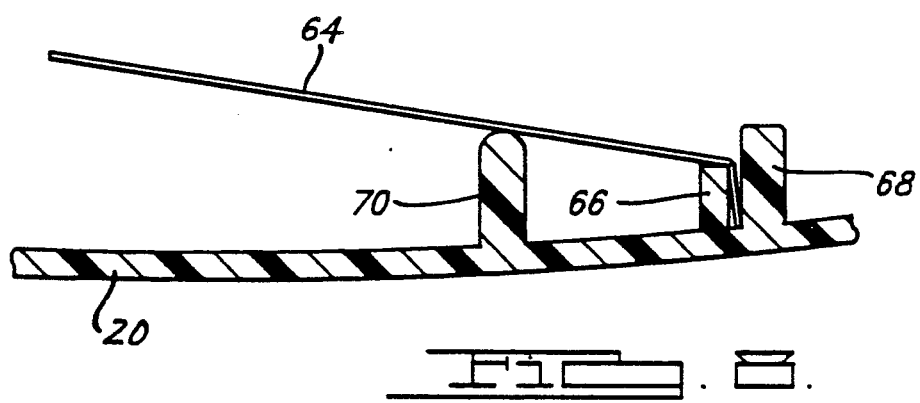
FIG. 8 is a sectional view of a portion of a second embodiment of the enclosure in accordance with the present invention showing an alternative means for adjusting the position of the detector.

Referring now to FIGS. 8 and 9 an alternative embodiment incorporating a cantilever bar for the restoring spring is shown. The cantilever bar restoring spring 64 has a number of advantages over the coil spring 60. It is made as a low cost stamping, is rugged, and can be easily staked to the lower housing member 20. This will enable a simple assembly of the upper housing member 20 to the upper housing member 22 without requiring holding or alignment fixtures. The rear of the restoring spring 64 is held between a front support 66 and rear support 68 and is pressed against fulcrum 70. As shown in FIG. 9, during assembly, the rear support 68 is staked onto the front support and onto the restoring spring 64. Thermal or ultrasonic deformation are two recommended low cost staking methods. This captures the spring in a pocket and will result in consistent positional force constants for all units. FIG. 9 also shows the spring 64 being deflected by the detector 34. If desired, similar adjustment means may be provided for adjusting the vertical position of the detector 34 as well.

It will be appreciated that the above described components provide an auto dimmer sensor module 14 in which the lens 32 and detector 34 are rigidly fixed into a single stable structure that is not influenced by the final assembly process. While the lower housing member 20 to upper housing member 22 support distance might vary slightly in the final assembly process (or due to temperature excursions after vehicle installation,) this only varies the force that holds the detector 34 to the adjustment screw 58 but does not change its positional alignment.

During assembly of the circuit board 24 to the upper housing unit 22, the detector 34, which has been soldered to the PC Board 24 along with the other electronic components, is aligned between the support walls 48 and simply dropped into the upper housing unit member 22. Bosses (not shown) which have been molded into the upper unit 22, support the PC Board 24 in the proper position and at the proper height. By utilizing the spring characteristics of the lower 20 and upper 22 housing members, a V shaped ridge (not shown) may be molded along the inside of the cover on parallel edges and a corresponding depression may be molded on the outside of the side edges of the upper housing 22 with dimensions chosen to form a tight fit when mated with the lower housing member 20. Thus, attachment of the lower housing member 20 to the upper member 22 consists of simply aligning the two parts and snapping them together with slight hand pressure.

Referring now to FIGS. 10 and 11 a preferred embodiment of the detector 34 is shown. The detector 34 includes a silicon light sensor 70 which comprises a conventional large area photodiode such as the type 21D557 manufactured by the Vactec division of EG&G. The silicon light sensor 70 is attached to an electrical lead frame 72 which is molded into a detector body 74 with a molding compound such as Hysol MG-18-5071. It is desirable to have a molding compound which effectively blocks incoming visible light from reaching the detector 70.

An aperture plate 76 comprising a rectangular opaque member with a rectangular window aperture 78 is placed in front of the silicon light sensor 70 to define the exposed area of the light sensor 70. The light that falls on the detector 34 outside the rectangular aperture 78 is either absorbed by the aperture plate 76 or is reflected away from the detector 34. Thus, by its placement at the image plane of the lens 32, the rectangular aperture 78 defines the left, right, up and down viewing angles of the optical system.

The light that passes through the aperture 78 then passes through an optical filter 80 before reaching silicon detector 70. For an automatic headlamp dimmer application the filter 80 preferably rejects the ultra-violet, and visible light wavelengths, and passes only the infrared wavelengths to the silicon detector 70. It has been found that the use of infrared wavelengths reduces unwanted noise, since reflections from road surfaces or signs do not contain significant levels of infrared light while auto headlamps and tail lamps do.

In order to detect all of the light that passes through the aperture 78 and transmission filter 80, the silicon light sensor 70 is made larger than the aperture 78 by an amount dependant upon the extreme entrance ray angles, and the associated manufacturing tolerances of the detector. It can be seen that the detector body 74 holds the silicon light sensor 70, electrical leads 72, transmission filter 80 and aperture plate 76 together as a single rigid assembly. Alternatively, the transmission filter 80 can be prepared as a separate component and then bonded to the silicon light sensor 70, with the molded body producing a rugged light detector assembly 34. In either case, it is desirable that the distance between the surface of the silicon light detector 70 and the front surface of the transmission filter (rear surface of the aperture plate 76) be minimized so as to minimize the required silicon chip area and facilitate the proper focusing of the light transmitted through lens 32 onto the detector 70.

A preferred method of fabricating the aperture plate 76 is to hot stamp the aperture plate 76 directly onto the front surface of the transmission filter 80 with an opaque hot stamp tape-based material. For use with a silicon detector 70, the hot stamp material should be opaque over an optical wavelength range that extends from the near infrared to the ultraviolet, a range easily achieved by many of the carbon pigment based tapes. One such tape that may be used, for example, is type C20116 manufactured by M. Swift & Sons. The resulting aperture can thus be precisely positioned with respect to the silicon detector 70 by an easily fixtured low-cost manufacturing process. Moreover, the resulting aperture plate is very thin, resulting in an optical response characteristic with a very sharp angular cutoff. This is in contrast to the diffuse angular cutoff characteristics achieved with commonly used separate metal or plastic aperture plates.

It should be noted that alternate methods of forming the aperture, such as silk screening, photomask generation of the aperture plate, or the application of a separate thin film plastic or metal foil applique can also produce a thin, well defined aperture. However, in general these approaches have higher processing costs than the preferred hot stamp method.

The aperture is not limited to a rectangular shape as shown in FIGS. 10 and 11. Rather, as shown in FIG. 12, the aperture plate 82 may alternatively be provided with an aperture 84 having a reduced open area on one side 86. This shape has been found to be useful for the automatic headlamp dimmer systems 10 to restrict the view of the sensor in the area of high mounted traffic control signs and street lights. This is because the reduced portion 86 will have the effect of masking the view of the upper right portion of the field of view of the auto dimmer system 10, due to inversion of the image.

Referring now to FIG. 13 there is shown an aperture 88 with a variable density pattern that can be used to reduce sensitivity of the light detector 34 in specific viewing areas. The aperture 88 in FIG. 13 includes an opening 90, a reduced portion 92 and a half-toned pattern 94 on one side. It will be appreciated that the half-tone pattern 94 will reduce the sensitivity of the silicon light sensor 70 on the left portion of the field of view. Due to the inversion of the image, the right side of the aperture 88 corresponds to the far left (driver) side of the field-of-view of the automatic headlamp dimmer system 10. The half-tone pattern 94 is useful because the only light sources of interest (oncoming headlights) in this area will be close and very bright to the light sensor 70. Variations such as the half-tone patterns 94 are easy to apply with hot stamped applique aperture plates. Also, because the resulting detector 34 is a single rugged unit, misalignment or damage during assembly of the sensor module will be greatly reduced as compared to prior methods of assembly.

While the above description constitutes the preferred embodiment of the invention, it will be appreciated that the invention is susceptible to modification, variation and change without the parting from the proper scope and fair meaning of the claims.

We claim:

1. A vehicle light sensor comprising:
   a detector for producing an electrical signal in response to incoming light;
   upper and lower enclosure members for enclosing said detector;
   a lens for receiving light and focusing it on said detector;
   at least one of said upper and lower enclosure members having a receptacle for mounting said lens;
   optical chamber within said enclosure members disposed adjacent to said light detector for preventing light that does not pass through said lens from reaching said light detector; and
   a plurality of spaced, thin-walled, optical baffles protruding into said optical chamber, wherein off axis light outside a desired entrance angle is incident on one of said baffles and is captured between said baffle and an adjacent baffle, whereby said off axis light is substantially prevented from reaching said detector.

2. The vehicle light sensor of claim 1 wherein said baffles form consecutively smaller apertures as their distance from the detector decreases.

3. The vehicle light sensor of claim 1 wherein said baffles and said optical chamber are formed by interior portions of said upper and lower enclosure members.

4. The vehicle light sensor of claim 1 further comprising a transmission filter positioned in front of said detector for blocking selected wavelengths of incoming light.

5. The vehicle light sensor of claim 4 wherein said transmission filter blocks visible and ultraviolet wavelengths but transmits infrared wavelengths.

6. The vehicle light sensor of claim 1 further comprising:
 lens flanges molded integrally with said lens;
 one of said enclosure members having a seat portion adapted to receive said lens flanges; and
 a pair of pins attached to one of said enclosure members and deformed around said lens flange.

7. The vehicle light sensor of claim 6 wherein said seat portion includes a plurality of supports upon which the lens flanges rest, said supports being easily modified to permit precise adjustment of the lens position.

8. The vehicle light sensor of claim 1 wherein one of said enclosure members includes a means for holding said detector, and a means for adjusting the position of said detector within said enclosure member.

9. The vehicle sensor of claim 8 wherein said means for adjusting the position of said detector further comprises a coil spring and a screw mounted on opposite sides of said detector.

10. The vehicle light sensor of claim 8 wherein said means for adjusting includes a screw and a cantilevered leaf spring, each making contact with said detector on opposite sides.

11. The vehicle light sensor of claim 1 wherein said lens, said optical chamber, and said detector are all located on said lower enclosure member.

12. The vehicle light sensor of claim 11 wherein said upper and lower enclosure members are molded of a low mold shrinkage, low thermal coefficient of expansion, plastic.

13. The vehicle light sensor of claim 1 further comprising:
 a thin aperture plate attached to said detector, said plate being opaque to light for preventing light from reaching said detector; and
 an opening in said aperture plate for permitting light to reach said detector.

14. The vehicle light sensor of claim 13 wherein said opening is rectangular in shape.

15. The vehicle light sensor of claim 13 wherein said opening is non-rectangular and defines an aperture that obstructs light received from the upper right portion of the field of view of the detector.

16. The vehicle light sensor of claim 13 wherein said thin aperture plate is a thin film having a thickness of less than 0.05 inches.

17. The vehicle light sensor of claim 13 wherein said thin aperture plate includes a shaded portion for reducing the intensity of light reaching the detector in a portion of the field of view of the detector.

18. The vehicle light sensor of claim 17 wherein said shaded portion comprises a series of triangular portions protruding into said opening.

19. A light sensor module for an automatic headlamp dimmer system comprising:
 a detector for producing electrical signals in response to incoming light;
 a circuit board coupled to said detector for processing said electrical signals;
 an enclosure for containing said detector and said circuit board;
 a thin aperture plate mounted directly to said detector, said plate being opaque to light and having a thickness of less than 0.05 inches;
 an opening on said aperture plate for permitting light within a limited zone to reach said detector.

20. The light sensor of claim 19 wherein said detector includes a detection surface and a transmission filter attached to said detection surface.

21. The light sensor of claim 19 wherein said opening is rectangular in shape.

22. The light sensor of claim 19 wherein said opening is non-rectangular and defines an aperture that obstructs light received from the upper right portion of the field of view of the detector.

23. The light sensor of claim 19 wherein said thin aperture plate includes a shaded portion for reducing the intensity of light reaching the detector in a portion of the field of view of the detector.

* * * * *